United States Patent
Yang et al.

(10) Patent No.: US 12,255,848 B2
(45) Date of Patent: Mar. 18, 2025

(54) INFORMATION FEEDBACK METHOD AND DEVICE, AND COMMUNICATION NODE AND STORAGE MEDIUM

(71) Applicant: ZTE CORPORATION, Shenzhen (CN)

(72) Inventors: Zhen Yang, Shenzhen (CN); Nan Zhang, Shenzhen (CN); Kaibo Tian, Shenzhen (CN); Wei Cao, Shenzhen (CN); Chenchen Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 377 days.

(21) Appl. No.: 17/758,467

(22) PCT Filed: Mar. 5, 2021

(86) PCT No.: PCT/CN2021/079287
§ 371 (c)(1),
(2) Date: Jul. 7, 2022

(87) PCT Pub. No.: WO2021/232890
PCT Pub. Date: Nov. 25, 2021

(65) Prior Publication Data
US 2023/0038330 A1 Feb. 9, 2023

(30) Foreign Application Priority Data
May 22, 2020 (CN) .......................... 202010444214.3

(51) Int. Cl.
*H04L 12/00* (2006.01)
*H04L 1/00* (2006.01)
(Continued)

(52) U.S. Cl.
CPC .......... *H04L 5/0057* (2013.01); *H04L 1/0003* (2013.01); *H04L 1/0026* (2013.01); *H04W 72/23* (2023.01)

(58) Field of Classification Search
CPC ... H04L 5/0057; H04L 1/0003; H04L 1/0026; H04L 1/0009; H04W 72/23; H04W 72/542; H04W 8/24; H04B 17/236
(Continued)

(56) References Cited

U.S. PATENT DOCUMENTS 9,203,589 B1    12/2015 Perets et al.
9,521,019 B2 *  12/2016 Khan ............... H04L 25/03343
(Continued)

FOREIGN PATENT DOCUMENTS

CN    102480761 A    5/2012
CN    102916785 A    2/2013
(Continued)

OTHER PUBLICATIONS

3GPP Technical Specification Group Radio Access Network. "Discussion on CSI feedback for LEO satellites in NTN," 3GPP TSG-RAN WG3 Meeting AH-2901, Jan. 21-25, 2019, pp. 1-13.
(Continued)

*Primary Examiner* — Frantz Coby
(74) *Attorney, Agent, or Firm* — Vivacqua Crane, PLLC

(57) ABSTRACT

Disclosed are an information feedback method and apparatus, and a communication node and a non-transitory computer-readable storage medium. The information feedback method may include: receiving a downlink data transmission instruction sent by a second communication node; and triggering, according to the downlink data transmission instruction, the first communication node to feed back demodulation capability information and channel state information (CSI) to the second communication node; the CSI
(Continued)

may include: a signal-to-noise ratio (SNR) and an SNR change rate of a received signal.

16 Claims, 3 Drawing Sheets

(51) Int. Cl.
  *H04L 5/00* (2006.01)
  *H04W 72/23* (2023.01)
(58) Field of Classification Search
  USPC .......................................................... 370/329
  See application file for complete search history.

(56) References Cited

U.S. PATENT DOCUMENTS

| | | | |
|---|---|---|---|
| 9,847,822 B2 * | 12/2017 | Murakami | .......... H04W 52/225 |
| 10,044,432 B2 * | 8/2018 | Murakami | .............. H04L 27/34 |
| 2016/0006540 A1 * | 1/2016 | Wang | ...................... H04B 3/32 |
| | | | 379/406.08 |
| 2018/0175983 A1 | 6/2018 | Yum et al. | |
| 2018/0205442 A1 | 7/2018 | Oteri et al. | |
| 2018/0323940 A1 | 11/2018 | Rico Alvarino et al. | |
| 2019/0215119 A1 | 7/2019 | Kim et al. | |
| 2020/0112357 A1 | 4/2020 | Fakoorian et al. | |
| 2022/0272717 A1 | 8/2022 | Chen et al. | |

FOREIGN PATENT DOCUMENTS

| | | | |
|---|---|---|---|
| CN | 103152754 A | | 6/2013 |
| CN | 103201963 A | | 7/2013 |
| CN | 102204152 B | * | 4/2015 ........... H04L 1/0026 |
| CN | 110535611 A | | 12/2019 |
| CN | 110582959 A | | 12/2019 |
| CN | 110831072 A | | 2/2020 |
| CN | 111901068 A | | 11/2020 |
| CN | 115189727 A | | 10/2022 |
| KR | 20180009747 A | | 1/2018 |
| WO | 2018030756 A1 | | 2/2018 |
| WO | WO-2019152894 A1 | * | 8/2019 ........... H04L 1/0004 |
| WO | WO-2020034592 A1 | * | 2/2020 ............. H04B 17/24 |
| WO | 2020055556 A1 | | 3/2020 |

OTHER PUBLICATIONS

3GPP Technical Specification Group Radio Access Network. "Discussion on link budget for NTN," 3GPP TSG-RAN WG1 Meeting #97, May 13-17, 2019, pp. 1-16.
3GPP Technical Specification Group Radio Access Network. "Feature lead summary #1 on NTN physical layer control procedures," 3GPP TSG-RAN WG1 Meeting #99, Nov. 18-22, 2019, pp. 1-13.
3GPP Technical Specification Group Radio Access Network. "TP for Section 6.2 in TR 38.821 on NTN PHY control procedures," 3GPP TSG-RAN WG1 Meeting #99, Nov. 18-22, 2019, pp. 1-7.
Japan Patent Office. Notice of Reasons for Refusal for JP Application No. 2022-542703 and English translation, mailed May 5, 2023, pp. 1-6.
Korean Intellectual Property Office. First Office Action for KR Application No. 10-2022-7022382 and English translation, mailed Jul. 20, 2023 pp. 1-13.
Indonesian Directorate General of Intellectual Property. First Office Action for ID Application No. P00202207821 and English translation, mailed Mar. 25, 2024, pp. 1-5.
The State Intellectual Property Office of People's Republic of China. First Office Action and Search Report for CN Application No. 202010444214.3 and English translation, mailed Mar. 27, 2024, pp. 1-15.
3GPP Technical Specification Group Radio Access Network. "MU factors contributing to DL SNR for demodulation and CSI," 3GPP TSG-RAN4 Meeting #88, Aug. 20-24, 2018, pp. 1-9.
International Searching Authority. International Search Report and Written Opinion for PCT Application No. PCT/CN2021/079287 and English translation, mailed Jun. 4, 2021, pp. 1-10.
European Patent Office. Extended European Search Report for EP Application No. 21808755.9, mailed May 24, 2024, pp. 1-7.
Intellectual Property Office of Singapore. Office Action for SG Application No. 11202250946E, mailed Sep. 9, 2024.

* cited by examiner

INFORMATION FEEDBACK METHOD AND DEVICE, AND COMMUNICATION NODE AND STORAGE MEDIUM

CROSS-REFERENCE TO RELATED APPLICATION

This application is a national stage filing under 35 U.S.C. § 371 of international application number PCT/CN2021/079287, filed Mar. 5, 2021, which claims priority to Chinese patent application No. 202010444214.3, filed on May 22, 2020. The contents of the international application are incorporated herein by reference in their entirety.

TECHNICAL FIELD

The present disclosure relates to the field of communications, for example, to an information feedback method and apparatus, a communication node, and a non-transitory computer-readable storage medium.

BACKGROUND

In a downlink of the radio communications technology (for example, Long Term Evolution (LTE) or New Radio (NR)), user equipment (UE) periodically feeds back Channel State Information (CSI), so that a base station selects, according to Channel Quality Indication (CQI) information in the CSI reported by the UE, an appropriate closed-loop Adaptive Modulation and Coding (AMC) mode to schedule a Modulation and Coding Scheme (MCS). This closed-loop AMC mode can make a scheduled MCS better match a current channel state, to improve performance of a communication link in a time-varying channel. However, this mode has two disadvantages. First, timeliness of the CQI fed back by the UE is poor in a high latency scenario, which makes the scheduled MCS fail to match the current channel state well, and thus affects link performance; second, in this mode, a smaller feedback period is configured to achieve a higher matching degree, causing a relatively large signaling overhead.

SUMMARY

The present disclosure provides an information feedback method and apparatus, a communication node, and a non-transitory computer-readable storage medium, to improve a matching degree between an MCS and a channel state and reduce signaling overheads for feedback.

An embodiment of the present disclosure provides an information feedback method which is applicable to a first communication node, which may include: receiving a downlink data transmission instruction sent by a second communication node; and triggering, according to the downlink data transmission instruction, the first communication node to feed back demodulation capability information and CSI to the second communication node, the CSI may include: a signal-to-noise ratio (SNR) and an SNR change rate of a received signal.

An embodiment of the present disclosure provides an information feedback method which is applicable to a second communication node, which may include: receiving demodulation capability information and CSI fed back by a first communication node; and determining an MCS for each time of scheduling according to the demodulation capability information and the CSI; the CSI may include: an SNR and an SNR change rate of a received signal.

An embodiment of the present disclosure provides an information feedback apparatus which is applicable to a first communication node, which may include: a first receiver unit configured to receive a downlink data transmission instruction sent by a second communication node; and a first feedback unit configured to trigger, according to the downlink data transmission instruction, the first communication node to feed back demodulation capability information and CSI to the second communication node; the CSI may include: an SNR and an SNR change rate of a received signal.

An embodiment of the present disclosure provides an information feedback apparatus which is applicable to a second communication node, which may include: a receiver unit configured to receive demodulation capability information and CSI fed back by a first communication node; and a determination module configured to determine an MCS for each time of scheduling according to the demodulation capability information and the CSI; the CSI may include: an SNR and an SNR change rate of a received signal.

An embodiment of the present disclosure provides a communication node, which may include: a communication module, a memory, and at least one processor, where the communication module is configured to perform communication interaction between the communication node and another communication node; the memory is configured to store at least one program; and the at least one program, when executed by the at least one processor, causes the at least one processor to implement the information feedback method according to any one of the foregoing embodiments.

An embodiment of the present disclosure provides a non-transitory computer-readable storage medium storing a computer program which, when executed by a processor, causes the processor to implement the information feedback method according to any one of the foregoing embodiments.

DETAILED DESCRIPTION

The embodiments of the present disclosure will be described below with reference to the accompanying drawings.

Figure 1:
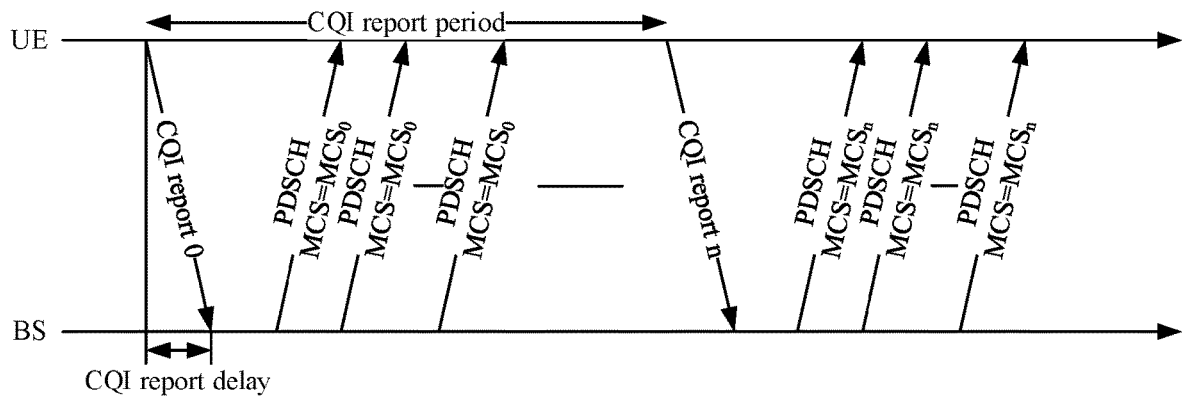
FIG. 1 is a schematic diagram of scheduling an MCS using a closed-loop AMC mechanism provided by the existing technology.

FIG. 1 is a schematic diagram of scheduling an MCS using a closed-loop AMC mechanism provided in the existing technology. In a downlink of the radio communications technology, for example, LTE or NR, the closed-loop AMC mechanism as shown in FIG. 1 is used to ensure that a scheduled MCS matches a current channel state. By using an example in which a first communication node is UE and a second communication node is a base station (BS), a process of scheduling the MCS using the closed-loop AMC mechanism is described.

As shown in FIG. 1, the UE reports a CQI value in each CSI report period, an effective range of the CQI value being 0-15. A larger CQI value indicates a better channel state and a higher supported bit rate and modulation order. The BS maps the CQI value as an MCS according to a specific rule, and before the next reported CSI value arrives, the BS uses the MCS to perform service scheduling on the UE.

In this mechanism, a matching degree between the MCS and the current channel state is influenced by two factors, one is CQI report delay, the other is CQI report period. The CQI report delay is related to a communication distance between the UE and the BS. A larger CQI report delay indicates lower effectiveness of the CQI reported by the UE. In a time-varying channel, the CQI report period is closely related to performance. A smaller CQI report period indicates a higher matching degree between the MCS and the current channel state, and more signaling overheads. On the contrary, a larger CQI report period indicates a lower matching degree and fewer signaling overheads.

Figure 2:
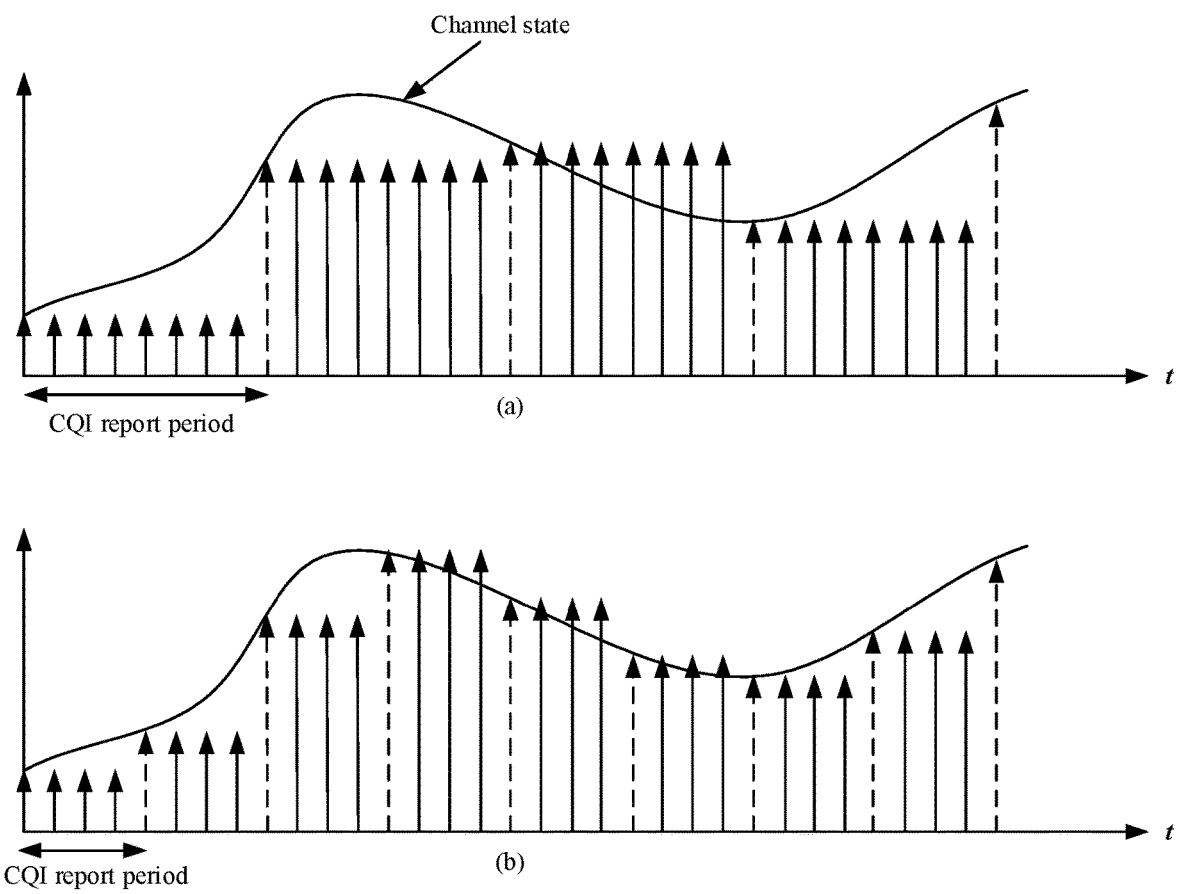
FIG. 2 is a schematic diagram of a matching relationship between an MCS and a current channel state provided by the existing technology.

FIG. 2 is a schematic diagram of a matching relationship between an MCS and a current channel state provided by the existing technology. As shown in FIG. 2, a CQI report period shown in (b) in FIG. 2 is ½ of that shown in (a) in FIG. 2, and it can be seen that a scheduled MCS in (b) has a higher matching degree with a current channel state. By using an example in which a first communication node is UE and a second communication node is a BS, a matching relationship between the MCS and the current channel state is described. As shown in FIG. 2, a time period between every two dashed lines is used as a CQI report period.

In a Non-Terrestrial Networks (NTN) scenario, a function of the BS is carried on a satellite or a ground station, and a communication distance between UE and BS is much longer than that in a terrestrial cellular network. Taking a low-earth-orbit satellite network with an altitude of 600 km and a minimum elevation of 10 degrees as an example, a round-trip delay of a signal is 4 to 13 ms. In this scenario, a CQI report delay is also longer than that in the terrestrial network, and effectiveness of CQI reporting is low. Further, due to a large satellite coverage and a large amount of UE, a relatively small CQI report period is configured to achieve a high MCS matching degree, causing an increase in uplink overheads. Because of the above disadvantages, the CSI feedback method is not suitable for an NTN communication scenario. Therefore, how to configure a new CSI feedback method suitable for the NTN communication scenario, which can not only improve the matching degree between the scheduled MCS and the current channel state, but also reduce signaling overheads, is an urgent problem to be solved.

An embodiment of the present disclosure provides an information feedback method. In implementation of the information feedback method, a first communication node does not need to feed back a CQI level, but directly feeds back a measured SNR and an SNR change rate. A second communication node uses the information and a CSI feedback delay to predict an SNR existing at a scheduling time, and then selects an appropriate MCS according to the predicted SNR to schedule the first communication node, thereby improving a matching degree between the scheduled MCS and an actual current channel state, and helping improve performance of an NTN network.

Figure 3:
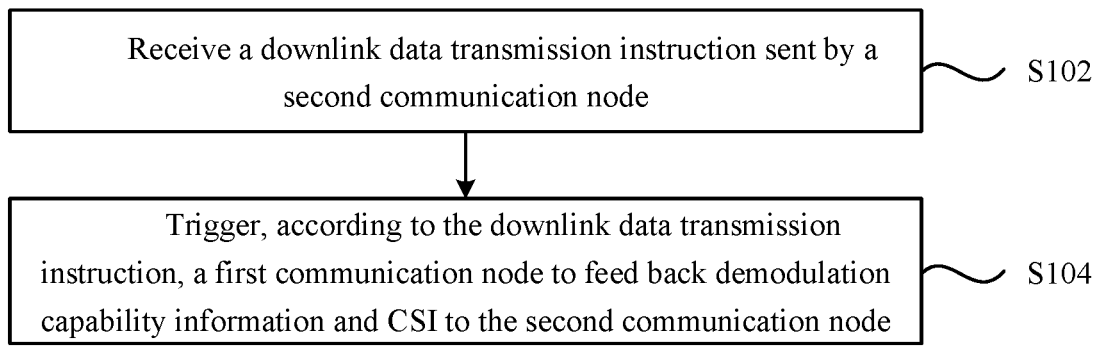
FIG. 3 is a flowchart of an information feedback method provided by an embodiment of the present disclosure.

In an embodiment, FIG. 3 is a flowchart of an information feedback method provided by an embodiment of the present disclosure. This embodiment may be performed by a first communication node (for example, a terminal side such as UE). As shown in FIG. 3, this embodiment includes: steps S102-S104.

At S102, a downlink data transmission instruction sent by a second communication node is received.

In an embodiment, the downlink data transmission instruction is an instruction that the second communication node plans to send downlink service data to a first communication node.

In an actual communication process, when the second communication node plans to send the downlink service data to the first communication node, the second communication node calculates a best MCS for scheduling at this time. At this time, the second communication node sends the downlink data transmission instruction to the first communication node, so that when receiving the downlink data transmission instruction, the first communication node feeds back, to the second communication node, demodulation capability information and CSI that are required for calculating the best MCS for scheduling.

At S104, the first communication node is triggered, according to the downlink data transmission instruction, to feed back the demodulation capability information and the CSI to the second communication node.

In an embodiment, the CSI includes: an SNR and an SNR change rate of a received signal. The demodulation capability information refers to an SNR corresponding to a block error rate (BLER) reaching a preset value, each time the first communication node checks data scheduled by using the MCS. In other words, the demodulation capability information of the UE refers to an SNR required when BLER reaches a specified value, when the UE checks, for each MCS, data scheduled by using the MCS.

In an embodiment, in a case in which the first communication node detects the downlink data transmission instruction, there is no need to feed back a CQI level, and instead, a measured SNR and SNR change rate and other information are directly fed back to the second communication node. The second communication node uses the information and a CSI feedback delay to predict an SNR existing at a scheduling time, and then selects an appropriate MCS according to the predicted SNR to schedule the first communication node, thereby improving a matching degree between the scheduled MCS and an actual current channel state, and helping improve performance of an NTN network.

In an embodiment, demodulation capability information of the first communication node is fed back to the second communication node through radio resource control (RRC) signaling or media access control (MAC) signaling.

In an embodiment, the CSI is fed back to the second communication node through a Physical Uplink Control Channel (PUCCH) or a Physical Uplink Shared Channel (PUSCH).

In an embodiment, the CSI is fed back in at least one of: a periodical manner; or a non-periodical manner. In an embodiment, the first communication node may feed back the CSI to the second communication node in a periodical manner or a non-periodical manner.

In an embodiment, corresponding to the periodical manner in which the CSI is fed back, the information feedback method further includes: receiving a configuration parameter sent by the second communication node through RRC signaling; and feeding back the CSI to the second communication node according to the configuration parameter.

In an embodiment, where the first communication node periodically feeds back the CSI, the second communication node sends the configuration parameter to the first communication node through the RRC signaling, and the first communication node feeds back the CSI to the second communication node according to the configuration parameter.

In an embodiment, in response to the CSI being fed back in a non-periodical manner, the information feedback method further includes: receiving downlink control information (DCI) signaling sent by the second communication node; and feeding back the CSI to the second communication node according to a parameter indicated by the DCI signaling.

In an embodiment, where the first communication node non-periodically feeds back the CSI, the second communication node instructs sending of the first communication node through the DCI signaling, and the first communication node feeds back the CSI to the second communication node according to the parameter indicated by the DCI signaling.

In an embodiment, the SNR change rate includes: a 1st order SNR change rate.

In an embodiment, a formula for calculating the 1st order SNR change rate includes:

$$r^{(1)}(t) = \lim_{\Delta t \to 0} \frac{SNR(t + \Delta t) - SNR(t)}{\Delta t}$$

where $\Delta t = t - t_{latest}$, $t_{latest}$ represents a feedback time of the latest CSI, t represents a current time of MCS scheduling, SNR(t) represents an SNR at time t, and SNR (t+$\Delta t$) represents an SNR at time t+$\Delta t$.

In an embodiment, the SNR change rate further includes: 2nd to n-th order SNR change rates, where n is a positive integer greater than or equal to 2.

A formula for calculating an n-th order SNR change rate includes:

$$r^{(n)}(t) = \lim_{\Delta t \to 0} \frac{r^{(n-1)}(t + \Delta t) - r^{(n-1)}(t)}{\Delta t}$$

where $r^{(n-1)}(t)$ represents an (n−1)-th order SNR change rate at time t, $r^{(n-1)}(t+\Delta t)$ represents an (n−1)-th order SNR change rate at time (t+$\Delta t$), and $\Delta t = t - t_{latest}$, $t_{latest}$ representing a feedback time of the latest CSI information, and t representing a current time of MCS scheduling.

In an embodiment, a maximum order of the SNR change rate is configured by the second communication node to the first communication node through the RRC signaling, the MAC signaling, or the DCI signaling; or the maximum order of the SNR change rate is 1 by default.

Figure 4:
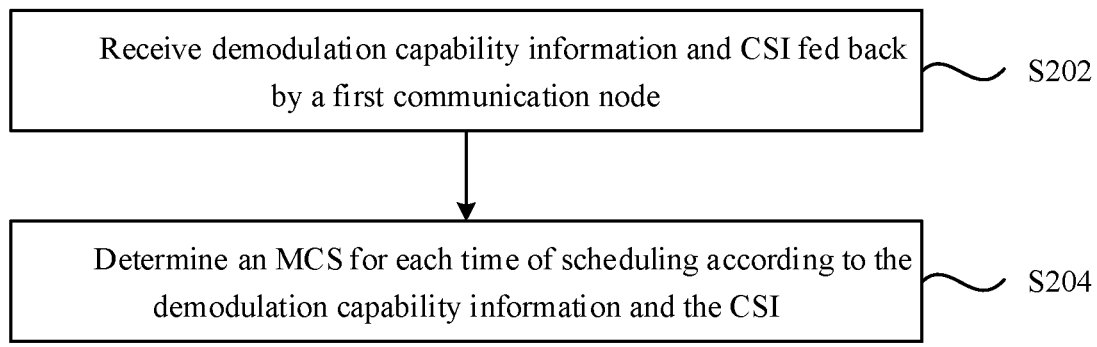
FIG. 4 is a flowchart of another information feedback method provided by an embodiment of the present disclosure.

FIG. 4 is a flowchart of another information feedback method provided by an embodiment of the present disclosure. This embodiment may be performed by a second communication node (for example, a network side such as a base station). As shown in FIG. 4, this embodiment includes: steps S202-S204.

At S202, demodulation capability information and CSI fed back by a first communication node are received.

At S204, an MCS for each time of scheduling is determined according to the demodulation capability information and the CSI; the CSI including: an SNR and an SNR change rate of a received signal.

In an embodiment, when the second communication node plans to send downlink service data to the first communication node, the second communication node first needs to send a downlink data transmission instruction to the first communication node. After receiving the downlink data transmission instruction, the first communication node feeds back its demodulation capability information and CSI to the second communication node, so that the second communication node predicts, according to the demodulation capability information and the CSI, an SNR existing at a scheduling time, and then selects, according to the predicted SNR, an appropriate MCS to schedule the first communication node. This improves a matching degree between the scheduled MCS and an actual current channel state and helps improve performance of an NTN network.

In an embodiment, the CSI is fed back in at least one of: a periodical manner; or a non-periodical manner.

In an embodiment, where the first communication node feeds back the CSI in a periodical manner, the information feedback method which is applicable to the second communication node further includes: sending a configuration parameter to the first communication node through RRC signaling, the configuration parameter being used to indicate a manner in which the first communication node feeds back the CSI.

In an embodiment, where the first communication node feeds back the CSI in a non-periodical manner, the information feedback method which is applicable to the second communication node further includes: sending DCI signaling to the first communication node, the DCI signaling being used to indicate a manner in which the first communication node feeds back the CSI.

In an embodiment, the SNR change rate includes: a 1st order SNR change rate.

In an embodiment, the SNR change rate further includes: 2nd to n-th order SNR change rates, where n is a positive integer greater than or equal to 2.

In an embodiment, a maximum order of the SNR change rate is configured by the second communication node to the first communication node through the RRC signaling, the MAC signaling, or the DCI signaling; or the maximum order of the SNR change rate is 1 by default.

In an embodiment, for descriptions of the CSI, the manner of feeding back the CSI, the SNR change rate, and other information related to the information feedback method which is applicable to the second communication node, refer to the descriptions in the corresponding embodiment of the information feedback method which is applicable to the first communication node. Details will not be repeated herein.

In an implementation, a process of determining the MCS is described by using an example in which the first communication node is UE and the second communication node is a BS. In a communication system, it is assumed that a BLER target value is set to α.

In an embodiment, the BS configures periodic CSI reporting (that is, feedback) to the UE through the RRC signaling, a report period being P subframes, and a maximum order of a reported SNR change rate is n.

The UE reports its demodulation capability information to the BS through the RRC signaling. Table 1 is a schematic table of content included in the demodulation capability information provided by this embodiment of the present disclosure. As shown in Table 1, the demodulation capability information includes MCS and SNR thresholds and correspondence between the two.

TABLE 1

A schematic table of content
included in the demodulation
capability information

| MCS | SNR threshold |
|-----|---------------|
| 0   | $T_0$         |
| 1   | $T_1$         |
| 2   | $T_2$         |
| ... | ...           |
| K   | $T_K$         |

The UE periodically reports the CSI to the BS by a report period of every P subframes. The CSI includes an SNR and 1st to n-th order SNR change rates of a received signal.

At time t, the BS plans to send downlink service data to the UE, and calculates the best MCS for scheduling at this time. Assuming that reported CSI information at a latest time $t_{latest}$ is SNR and $r^{(1)}, r^{(2)}, \ldots, r^{(n)}$ then the BS estimates, according to the reported CSI information, an SNR scheduled at time t, and a calculation expression of the estimated value is as follows:

$$\gamma = SNR + \frac{r^{(1)}}{1!}(\tau + \Delta t) + \frac{r^{(2)}}{2!}(\tau + \Delta t)^2 +, \ldots, + \frac{r^{(n)}}{n!}(\tau + \Delta t)^n$$

where $\tau$ represents a CQI report delay in the system, and $\Delta t = t - t_{latest}$.

The BS compares $\gamma$ with an SNR threshold corresponding to each MCS in the demodulation capability information of the UE as shown in Table 1, and selects the largest MCS with a corresponding threshold less than or equal to $\gamma$ as an MCS for this time of scheduling.

In an implementation, a process of determining the MCS is described by using an example in which the first communication node is UE and the second communication node is a BS. In a communication system, the BS performs scheduling for every subframe, the length of the subframe being 1 ms.

The BS configures periodic CSI reporting to the UE through RRC signaling, where a maximum order of a reported SNR change rate is 2, a report period is 10 ms, and an offset within the period is 0 ms.

The UE measures SNR every 5 ms, the latest three SNR measurements are $SNR_1$, $SNR_2$, and $SNR_3$.

The UE calculates an SNR change rate, and obtains a 1st order SNR change rate as $$\alpha = \frac{(SNR_3 - SNR_2)}{5},$$

and a 2nd order SNR change rate as $$\beta = \frac{(SNR_3 - SNR_2) - (SNR_2 - SNR_1)}{5}.$$

The UE reports CSI information to the BS in a subframe 0, the CSI including $SNR_3$, $\alpha$, and $\beta$.

If a report delay of the CSI information is 0 ms, an estimated SNR value for a subframe 1 to a subframe 9 is calculated as follows:

$$\gamma_k = \begin{cases} SNR_3 + \alpha + \beta & k = 1 \\ \gamma_{k-1} + \alpha + k\beta & 2 < k \leq 9 \end{cases}$$

By analogy, the UE updates the CSI information to the BS every 10 ms. Then the BS uses the updated CSI information to calculate an estimated SNR for the next 9 subframes.

The BS determines, according to the estimated SNR for each subframe and the demodulation capability reported by the UE, an MCS used for scheduling the UE.

In an implementation, a process of determining the MCS is described by using an example in which the first communication node is UE and the second communication node is a BS. In a communication system, the BS performs scheduling for every subframe, the length of the subframe being 1 ms.

The BS configures periodic CSI reporting to the UE through RRC signaling, where a maximum order of a reported SNR change rate is 2, a report period is 20 ms, and an offset within the period is 3 ms.

The UE configures periodic CSI reporting according to the RRC signaling, and reports CSI information to the BS at 3 ms, 23 ms, 43 ms, . . . , respectively, the CSI information including an SNR and 1st order and 2nd order change rates of SNR.

The BS instructs, through DCI signaling at time 15-ms, the UE to report CSI information at time 20-ms, the maximum order of the reported SNR change rate being 1.

According to aperiodic CSI reporting indicated by the DCI signaling, the UE reports the CSI information at 20-ms, the CSI information including the SNR and the 1st order change rate of SNR.

Figure 5:
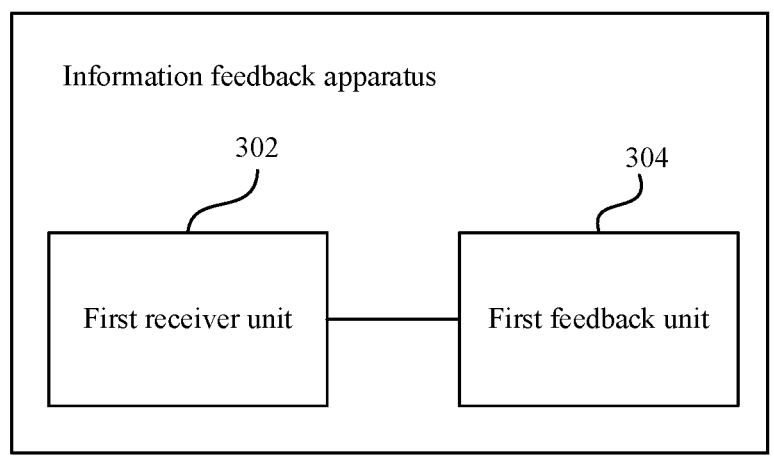
FIG. 5 is a block diagram of an information feedback apparatus provided by an embodiment of the present disclosure.

In an embodiment, FIG. 5 is a block diagram of an information feedback apparatus provided by an embodiment of the present disclosure. This embodiment is performed by the first communication node. As shown in FIG. 5, this embodiment includes: a first receiver unit 302 and a first feedback unit 304.

The first receiver unit 302 is configured to receive a downlink data transmission instruction sent by a second communication node; and the first feedback unit 304 is configured to trigger, according to the downlink data transmission instruction, the first communication node to feed back demodulation capability information and CSI to the second communication node; the CSI including: an SNR and an SNR change rate of a received signal.

The information feedback apparatus provided by this embodiment is configured to realize the information feedback method which is applicable to the first communication node in the embodiment shown in FIG. 3, and has implementation principles and technical effects similar to those of the information feedback method. Details are not described herein again.

In an embodiment, demodulation capability information of the first communication node is fed back to the second communication node through RRC signaling or MAC signaling.

In an embodiment, the CSI is fed back to the second communication node through PUCCH or PUSCH.

In an embodiment, the CSI is fed back in at least one of: a periodical manner; or a non-periodical manner.

In an embodiment, corresponding to the periodical manner in which the CSI is fed back, the information feedback apparatus further includes: a second receiver unit configured to receive a configuration parameter sent by the second communication node through RRC signaling; and a second feedback unit configured to feed back the CSI to the second communication node according to the configuration parameter.

In an embodiment, in response to the CSI being fed back in a non-periodical manner, the information feedback apparatus further includes: a third receiver unit configured to receive DCI signaling sent by the second communication node; and a third feedback unit configured to feed back the CSI to the second communication node according to a parameter indicated by the DCI signaling.

In an embodiment, the SNR change rate includes: a 1st order SNR change rate.

In an embodiment, the SNR change rate further includes: 2nd to n-th order SNR change rates, where n is a positive integer greater than or equal to 2.

In an embodiment, a maximum order of the SNR change rate is configured by the second communication node to the first communication node through the RRC signaling, the MAC signaling, or the DCI signaling; or the maximum order of the SNR change rate is 1 by default.

Figure 6:
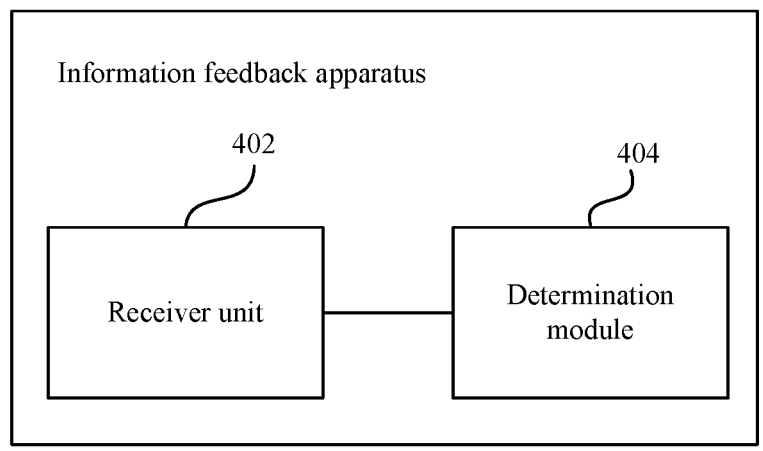
FIG. 6 is a block diagram of an information feedback apparatus provided by an embodiment of the present disclosure.

In an embodiment, FIG. 6 is a block diagram of an information feedback apparatus provided by an embodiment of the present disclosure. This embodiment is performed by the second communication node. As shown in FIG. 6, this embodiment includes: a receiver unit 402 and a determination module 404.

The receiver unit is configured to receive demodulation capability information and CSI fed back by a first communication node; and the determination module is configured to determine an MCS for each time of scheduling according to the demodulation capability information and the CSI; the CSI including: an SNR and an SNR change rate of a received signal.

The information feedback apparatus provided by this embodiment is configured to realize the information feedback method which is applicable to the second communication node in the embodiment shown in FIG. 4, and has implementation principles and technical effects similar to those of the information feedback method. Details are not described herein again.

In an embodiment, the CSI is fed back in at least one of: a periodical manner; or a non-periodical manner.

In an embodiment, where the first communication node feeds back the CSI in a periodical manner, the information feedback apparatus further includes: a first sender configured to send a configuration parameter to the first communication node through RRC signaling, the configuration parameter being used to indicate a manner in which the first communication node feeds back the CSI.

In an embodiment, where the first communication node feeds back the CSI in a non-periodical manner, the information feedback apparatus further includes: a second sender configured to send DCI signaling to the first communication node, the DCI signaling being used to indicate a manner in which the first communication node feeds back the CSI.

In an embodiment, the SNR change rate includes: a 1st order SNR change rate.

In an embodiment, the SNR change rate further includes: 2nd to n-th order SNR change rates, where n is a positive integer greater than or equal to 2.

In an embodiment, a maximum order of the SNR change rate is configured by the second communication node to the first communication node through the RRC signaling, the MAC signaling, or the DCI signaling; or the maximum order of the SNR change rate is 1 by default.

Figure 7:
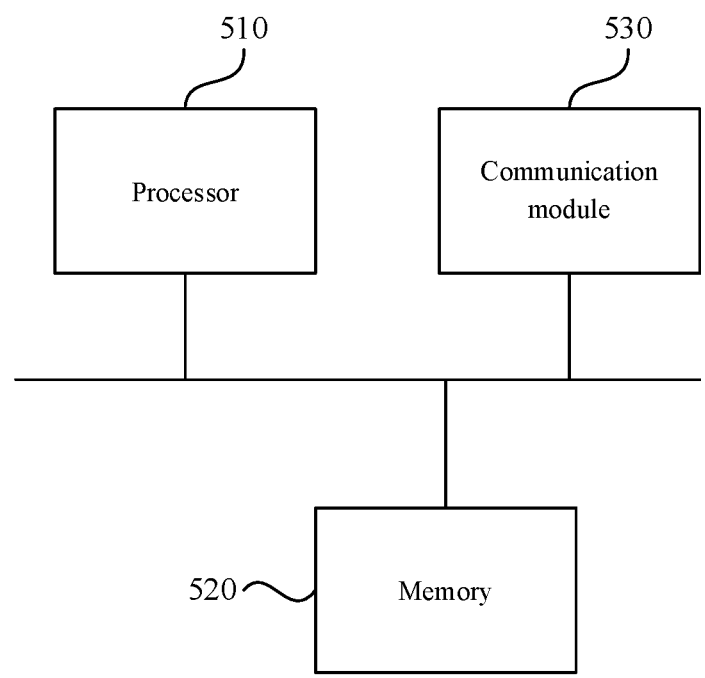
FIG. 7 is a schematic diagram of a communication node provided by an embodiment of the present disclosure.

FIG. 7 is a schematic diagram of a communication node provided by an embodiment of the present disclosure. As shown in FIG. 7, the communication node provided by the present disclosure includes: a processor 510, a memory 520 and a communication module 530. There may be one or more processors 510 in the communication node, and one processor 510 is shown as an example in FIG. 7. There may be one or more memories 520 in the communication node, and one memory 520 is shown as an example in FIG. 7. The processor 510, memory 520 and communication module 530 in the communication node may be connected by a bus or by other means. In FIG. 7, the connection is realized by a bus as an example. In this embodiment, the communication node may be a first communication node (for example, a terminal side such as a user equipment).

The memory 520, as a computer-readable storage medium, may be configured to store software programs, computer-executable programs, and modules, such as program instructions/modules (such as the first receiver unit 302 and the first feedback unit 304 in the information feedback apparatus) corresponding to the communication node in any embodiment of the present disclosure. The memory 520 may include a storage program area and a storage data area, where the storage program area may store an operating system and application program(s) required by at least one function, and the storage data area may store data created according to the use of the communication node, etc. In addition, the memory 520 may include a high-speed random access memory and a non-volatile memory, for example, at least one magnetic disk storage device, a flash memory device, or another non-volatile solid-state storage device. In some examples, the memory 520 may include memories remotely located with respect to the processor 510, and these remote memories may be connected to communication nodes via a network. Examples of the above-mentioned network include the Internet, an intranet, a local area network, a mobile communication network, and a combination thereof.

The communication module 530 is configured for communication interaction with another synchronization node.

When the communication node is a first communication node, the provided communication node may be configured to execute the information feedback method which is applicable to the first communication node provided by any of the above embodiments, and has corresponding functions and effects.

When the communication node is a second communication node, the provided communication node may be configured to execute the information feedback method which is applicable to the second communication node provided by any of the above embodiments, and has corresponding functions and effects.

A further embodiment of the present disclosure provides a storage medium including computer-executable instructions which, when executed by a computer processor, cause an information feedback method which is applicable to a first communication node to be performed, the method including: receiving a downlink data transmission instruction sent by a second communication node; and triggering, according to the downlink data transmission instruction, the first communication node to feed back demodulation capability information and CSI to the second communication node, the CSI including: an SNR and an SNR change rate of a received signal.

A further embodiment of the present disclosure provides a storage medium including computer-executable instructions which, when executed by a computer processor, cause an information feedback method which is applicable to a second communication node to be performed, the method including: receiving demodulation capability information and CSI fed back by a first communication node; and determining an MCS for each time of scheduling according to the demodulation capability information and the CSI, the CSI including an SNR and an SNR change rate of a received signal.

The term "user equipment" covers any suitable type of wireless user equipment, such as mobile phones, portable data processing equipment, portable web browsers or vehicle-mounted mobile stations.

Generally speaking, various embodiments of the present disclosure may be implemented in hardware or dedicated circuits, software, logic, or any combination thereof. For example, some aspects may be implemented in hardware, while other aspects may be implemented in firmware or software that may be executed by a controller, a microprocessor or another computing device. However, the present disclosure is not limited thereto.

Embodiments of the present disclosure may be implemented by a data processor of a mobile device executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure may represent program steps, or may represent interconnected logic circuits, modules and functions, or may represent a combination of program steps and logic circuits, modules and functions. The computer program may be stored in a memory. The memory may be of any type that is suitable for a local technical environment and may be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. An information feedback method which is applicable to a first communication node, comprising:
   receiving a downlink data transmission instruction sent by a second communication node; and
   triggering, according to the downlink data transmission instruction, the first communication node to feed back demodulation capability information and channel state information (CSI) to the second communication node;
   the CSI comprising: a signal-to-noise ratio (SNR) and an SNR change rate of a received signal; and
   the demodulation capability information refers to the SNR corresponding to a block error rate (BLER) reaching a preset value, each time the first communication node checks data scheduled by using a Modulation and Coding Scheme (MCS).

2. The method of claim 1, wherein feeding back demodulation capability information to the second communication node comprises:
   feeding back the demodulation capability information of the first communication node to the second communication node through radio resource control (RRC) signaling or medium access control (MAC) signaling.

3. The method of claim 1, wherein feeding back CSI to the second communication node comprises:
   feeding back the CSI to the second communication node through a physical uplink control channel (PUCCH) or a physical uplink shared channel (PUSCH).

4. The method of claim 1, wherein the CSI is fed back in at least one of: a periodical manner; or a non-periodical manner.

5. The method of claim 4, corresponding to the periodical manner in which the CSI is fed back, the method further comprising:
   receiving a configuration parameter sent by the second communication node through RRC signaling; and
   feeding back the CSI to the second communication node according to the configuration parameter.

6. The method of claim 4, in response to the CSI being fed back in a non-periodical manner, the method further comprising:
   receiving downlink control information (DCI) signaling sent by the second communication node; and
   feeding back the CSI to the second communication node according to a parameter indicated by the DCI signaling.

7. The method of claim 1, wherein the SNR change rate comprises:
   a 1st order SNR change rate.

8. The method of claim 7, wherein the SNR change rate further comprises:
   2nd to n-th order SNR change rates, wherein n is a positive integer greater than or equal to 2.

9. The method of claim 7, wherein a maximum order of the SNR change rate is configured by the second communication node to the first communication node through the RRC signaling, the MAC signaling, or the DCI signaling; or the maximum order of the SNR change rate is 1 by default.

10. An information feedback method which is applicable to a second communication node, comprising:
    receiving demodulation capability information and channel state information (CSI) fed back by a first communication node; and
    determining a modulation and coding scheme (MCS) for each time of scheduling according to the demodulation capability information and the CSI, the CSI comprising a signal-to-noise ratio (SNR) and an SNR change rate of a received signal; wherein
    the demodulation capability information refers to the SNR corresponding to a block error rate (BLER) reaching a preset value, each time a first communication node checks data scheduled by using the MCS.

11. The method of claim 10, in response to the first communication node feeding back the CSI in a periodical manner, the method further comprising:
    sending a configuration parameter to the first communication node through radio resource control (RRC) signaling, the configuration parameter being used to indicate a manner in which the first communication node feeds back the CSI.

12. The method of claim 10, in response to the first communication node feeding back the CSI in a non-periodical manner, the method further comprising:
    sending downlink control information (DCI) signaling to the first communication node, the DCI signaling being used to indicate a manner in which the first communication node feeds back the CSI.

13. A communication node, comprising: a communication module, a memory, and at least one processor, wherein:
the communication module is configured to perform communication interaction between the communication node and communication nodes other than the communication node;
the memory is configured to store at least one program; and
the at least one program, when executed by the at least one processor, causes the at least one processor to implement the information feedback method of claim 1.

14. A non-transitory computer-readable storage medium storing a computer program which, when executed by a processor, causes the processor to implement the information feedback method of claim 1.

15. A communication node, comprising: a communication module, a memory, and at least one processor, wherein:
the communication module is configured to perform communication interaction between the communication node and communication nodes other than the communication node;
the memory is configured to store at least one program; and
the at least one program, when executed by the at least one processor, causes the at least one processor to implement the information feedback method of claim 10.

16. A non-transitory computer-readable storage medium storing a computer program which, when executed by a processor, causes the processor to implement the information feedback method of claim 10.

* * * * *